Nov. 11, 1969    G. DI BARTOLOMEO    3,477,743
FLUID PRESSURE COUPLING DEVICES

Filed Nov. 3, 1967    2 Sheets-Sheet 1

United States Patent Office 3,477,743
Patented Nov. 11, 1969

3,477,743
FLUID PRESSURE COUPLING DEVICES
Giacomo Di Bartolomeo, Turin, Italy, assignor to Compagnia Italiana Westinghouse Freni e Segnali, Boggio, Turin, Italy
Filed Nov. 3, 1967, Ser. No. 680,577
Claims priority, application Italy, Nov. 10, 1966, Patent 787,770
Int. Cl. F16l 55/00, 25/00
U.S. Cl. 285—12     6 Claims

ABSTRACT OF THE DISCLOSURE

A coupling device for attachment to a railway vehicle brake line has a front connector for automatic coupling of the line in conjunction with vehicle coupling. A lateral connector, for manual coupling, is provided on a head which is movable into an operative position in which it communicates with the front connector. When manual coupling is not desired the head is moved into an inoperative position in which it is clear of the front connector.

---

The invention relates to fluid pressure coupling devices and more particularly to such devices for coupling railway vehicle brake lines.

Known devices of this kind are designed for manual coupling of the vehicle brake lines and comprise a head with a lateral connector or mouthpiece connected to the end of a brake line of a railway vehicle, adapted to be coupled to a similar head having a lateral connector or mouthpiece on a brake line of another vehicle to establish the desired continuity of the brake lines.

The modern trend towards use on railway vehicles of automatic couplings instead of manual couplings necessitates, automatic coupling of the vehicle brake lines (compressed air piping), necessitating a modification of the pneumatic couplings in that the coupling devices for this purpose should have a front instead of a lateral connector or mouthpiece.

During the transitionary period when the vehicle couplings and brake line coupling devices are being modified, vehicles will be in use which are provided with older coupling devices having heads with a lateral mouthpiece and newer coupling devices having heads with a front mouthpiece.

An object of the invention is to provide a coupling device which in addition to being suitable for connection with a coupling by way of a lateral connector can be readily used for connection with a coupling by way of a front connector, whereby formation of a train of mixed vehicles is made possible.

With the above object in view the invention provides a coupling device for attachment to a railway vehicle brake line comprising a head provided with lateral connector means adapted to communicate with a brake line of a vehicle and to be coupled to a similar lateral connector means on another vehicle, characterised by a sleeve member adapted to be secured to and to communicate with a said brake line, front connector means at one end of the sleeve member adapted to be coupled to conjugate connector means on another vehicle, the head having the lateral connector means being movable relative to the sleeve member into and out of an operative position in which it is connected to the front connector means to place the lateral connector means in communication with the sleeve member.

Preferably the head is pivotally attached to the sleeve member and is rotatable about a pivot axis from its operative position into an inoperative position in which the head is disposed clear of the front connector means.

Further characteristic features of the invention will be described with reference to the accompanying drawings, by way of a non-limiting example only. In these drawings.

Figure 1:
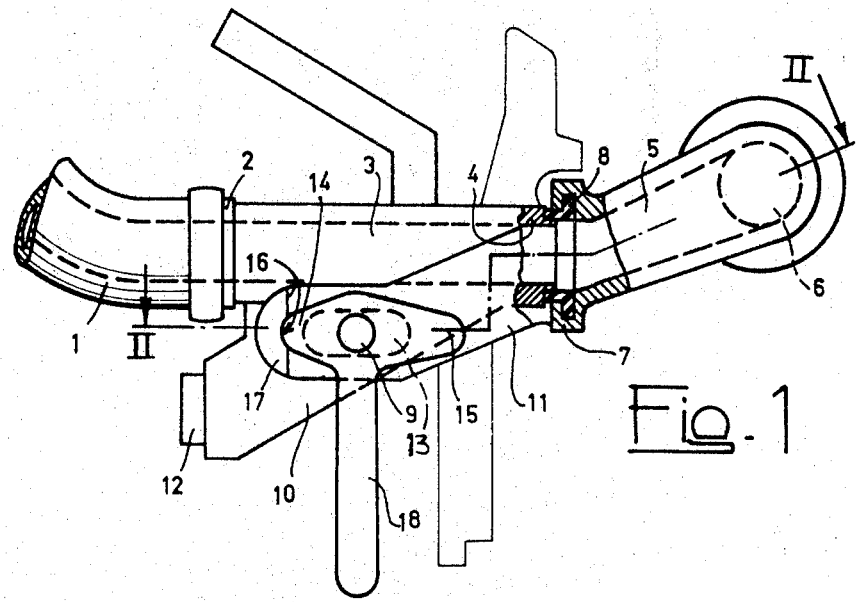
FIGURE 1 is a side elevational view of a coupling device according to one embodiment of the invention, having a head with a lateral mouthpiece in its operative position.
Figure 3:
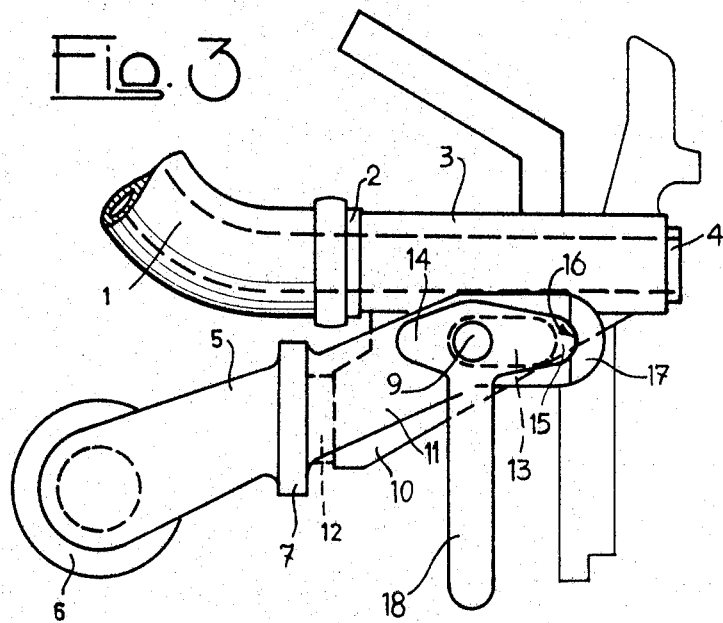
FIGURE 3 is a side elevational view of the coupling device of FIGURES 1 and 2, shown with the head having lateral connector means in the form of a lateral mouthpiece disposed in its inoperative position.
Figure 2:
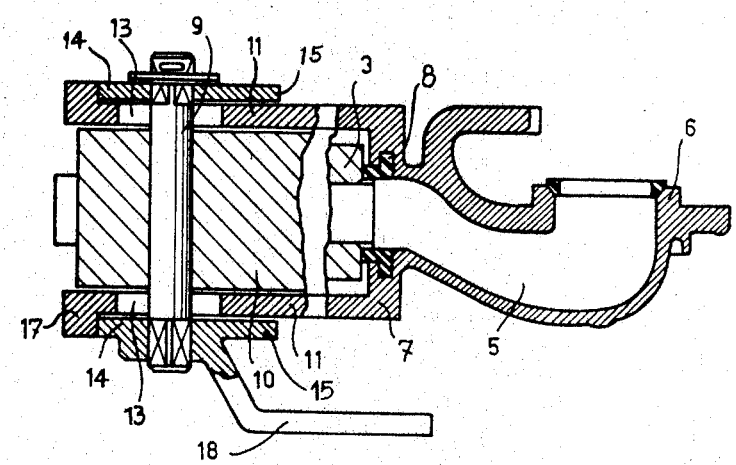
FIGURE 2 is a cross-sectional view on line II—II of FIGURE 1.

A railway vehicle brake line comprises, at least in part, a flexible hose 1 for connecting compressed air piping of a railway vehicle (not shown) with compressed air piping of another vehicle (not shown) by way of coupling devices secured to the hose 1 of each vehicle. One such coupling device is shown in FIGURES 1 to 3.

According to the invention the coupling device has a sleeve member 3 secured at one end to the free end 2 of the hose 1 and provided at its other end with a front connector means in the form of a front mouthpiece 4 suitable for connection with a conjugate front connector (not illustrated) of a similar coupling device on a further vehicle (not shown).

A head 5 has at one end a lateral mouthpiece 6 of conventional type, the other end of the head 5 being provided with socket 7 which is adapted to fit on to mouthpiece 4 on the sleeve member 3. An annular sealing member 8 of resiliently yieldable material carried by the socket 7 forms a seal around the mouthpiece 4 when the head 5 is disposed in an operative position, shown in FIGURES 1 and 2. In this position the sleeve member 3 is placed in direct communication with the lateral mouthpiece 6 through the head 5.

In its operative position the head 5 can be connected manually to a similar head having a lateral mouthpiece, carried by a further vehicle (not shown) to establish continuity of the compressed air brake lines of the two vehicles fitted with the respective coupling devices.

A mechanical hinged connection is provided between the head 5 and sleeve member 3 enabling the head 5 to be swung from its operative position (FIGURE 1) into an inoperative position (FIGURE 3). In the inoperative position of the head 5 the mouthpiece 4 is exposed and faces forwardly so that it may be coupled automatically with a conjugate mouthpiece or socket provided on another vehicle (not shown) having automatic coupling means.

The hinged connection is provided by a laterally extending hinge pin 9 rotatably mounted in a lateral extension 10 on the sleeve member 3. The ends of the hinge pin 9 extending outwardly from the extension 10 (FIGURE 2) are received in respective axially elongated holes 13 provided in two wings 11, fast with the head 5, situated on either side of the sleeve member 3.

The extension 10 is provided with a dummy connector maens comprising a dummy mouthpiece 12 facing axially in the opposite direction to the mouthpiece 4 and adapted to engage the socket 7 on the head 5 when the latter is disposed in its inoperative position (FIGURE 3). Since the dummy mouthpiece 12 faces in the opposite direction to the mouthpiece 4, its axis extending parallel with the axis of the mouthpiece 4, the operative and inoperative positions of the head 5 are angularly displaced by 180° with respect to each other.

The axially elongated holes 13 in the wings 11 allow limited translational displacement of the head 5 relative to the sleeve member 3 in either direction. The hinge pin 9 is provided at each of its ends outwardly of the wings 11 with a pair of cam members 14, 15 disposed on opposite sides of the hinge pin axis. Each cam member 14, 15 comprises a rounded nose which engages in a notch 16 provided in a laterally outwardly extending portion 17 of the respective wing 11 when the head 5 is in its operative and inoperative position respectively, to retain the head 5 in said position.

When the head 5 is in its operative positions (FIGURES 1 and 2) the cam member 14 is engaged by the notch 16 and holds the socket 7 pressed against the mouthpiece 4, resiliently compressing the sealing members 8 and effecting a seal.

In the inoperative position (FIGURE 3) of the head 5 the socket 7 engages the dummy mouthpiece 12 and the cam member 15, which is then engaged by the notch 16, holds the head 5 in this position.

In order to move the head 5 from one position to the other the respective cam members 14, 15 are disengaged from the notches 16, whereupon it is possible to displace the head 5 axially along the elongated holes 13 in order to release the socket 7 from the mouthpiece 4 or 12, as the case may be, before effecting rotation of the head 5 to its other position. A lever arm 18 is keyed to the hinge pin 9 and is rotatable by hand to release the cam members 14, 15 from, or engage them with, the notches 16.

I claim:

1. A fluid pressure coupling device for attachment to a railway vehicle brake line, said device comprising: A sleeve member adapted to be secured to and communicate with a brake line, front connector means at one end of the sleeve member, a head having a lateral connector means, the head being connected to the sleeve by hinged attachment means and movable relative to the sleeve member into an operative position, in which the head is connected to said front connector means and communicates with the sleeve member, and into an inoperative position in which the head is disconnected from and clear of the front connector means, the sleeve member having a lateral extension, the head having two wings disposed on opposite sides of the sleeve member, the hinged attachment means including a laterally extending hinge pin extending through said wings and said lateral extension, and a dummy connector means, substantially the same as said front connection means, provided on the lateral extension of the sleeve member, said dummy connector means facing in the opposite direction to the front connector means, the wings defining holes which receive opposite respective ends of the hinge pin and which are elongated in a direction parallel to the axes of said connector means, permitting relative translational displacement of the head and the sleeve member with respect to each other in said direction when the locking means are disengaged thereby allowing said head to be connected to said dummy connector means in substantially the same manner as said head is connected to said front connector means.

2. Device as claimed in claim 1 including locking means engageable with the head to retain the latter in its operative and inoperative positions selectively.

3. Device as claimed in claim 1 wherein the inoperative position of the head is angularly displaced by substantially 180° relative to the operative position thereof.

4. A fluid pressure coupling device for attachment to a railway vehicle brake line, said device comprising: a sleeve member adapted to be secured to and communicate with a brake line, front connector means at one end of the sleeve member, a head having a lateral connector means, the head being connected to the sleeve by hinged attachment means and movable relative to the sleeve member into an operative position, in which the head is connected to said front connector means and communicates with the sleeve member, and into an inoperative position in which the head is disconnected from and clear of the front connector means, locking means engageable with the head to retain the latter in its operative and inoperative positions selectively, the sleeve member having a lateral extension, the head having two wings disposed on opposite sides of the sleeve member, the hinged attachment means including a laterally extending hinge pin extending through said wings and said lateral extension, wherein the locking means includes a pair of cam members carired by the hinge pin, and a notch is provided on the head which is engaged by respective said cam members in the operative and inoperative positions respectively of the head.

5. Device as claimed in claim 4 wherein a said pair of cam members is provided at each end of the hinge pin, a respective said notch being provided on each of the wings and co-operating with each respective pair of cam members.

6. Device as claimed in claim 4 wherein the hinge pin is rotatable in said lateral extension of the sleeve member, and an opearting lever is attached to the hinge pin to rock the cam members about the axis of the hinge pin selectively to engage and disengage the said notch.

References Cited

UNITED STATES PATENTS

| 1,656,020 | 1/1928 | Robinson | 285—12 |
| 1,706,752 | 3/1924 | Robinson | 285—12 |
| 1,930,183 | 10/1933 | Robinson | 285—12 |
| 3,300,235 | 1/1967 | Blackwell | 285—312 |

FOREIGN PATENTS

| 340,501 | 3/1904 | France. |

DAVID J. WILLIAMOWSKY, Primary Examiner

DAVE W. AROLA, Assistant Examiner

U.S. Cl. X.R.

285—63, 312